United States Patent
Travostino

(10) Patent No.: US 10,789,542 B2
(45) Date of Patent: Sep. 29, 2020

(54) SYSTEM AND METHOD FOR PREDICTING CHANGES IN NETWORK QUALITY

(71) Applicant: Apple Inc., Cupertino, CA (US)

(72) Inventor: Franco Travostino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 14/866,823

(22) Filed: Sep. 25, 2015

(65) Prior Publication Data

US 2016/0359719 A1 Dec. 8, 2016

Related U.S. Application Data

(60) Provisional application No. 62/171,937, filed on Jun. 5, 2015, provisional application No. 62/172,201, filed on Jun. 7, 2015.

(51) Int. Cl.
| | |
|---|---|
| *G06N 20/00* | (2019.01) |
| *H04L 12/24* | (2006.01) |
| *H04L 12/26* | (2006.01) |
| *H04W 48/18* | (2009.01) |
| *G06N 7/00* | (2006.01) |
| *G06N 20/10* | (2019.01) |

(52) U.S. Cl.
CPC ............. *G06N 20/00* (2019.01); *G06N 7/005* (2013.01); *G06N 20/10* (2019.01); *H04L 41/147* (2013.01); *H04L 41/16* (2013.01); *H04L 43/0811* (2013.01); *H04W 48/18* (2013.01)

(58) Field of Classification Search
CPC ..... G06N 99/005; H04L 41/147; H04L 41/16; H04L 43/0811; H04W 48/18
See application file for complete search history.

(56) References Cited

U.S. PATENT DOCUMENTS

| | | | |
|---|---|---|---|
| 8,660,556 B2 | 2/2014 | Beattie et al. | |
| 8,832,258 B2 | 9/2014 | Griff et al. | |
| 8,848,566 B2 | 9/2014 | Dunne et al. | |
| 2007/0168494 A1* | 7/2007 | Liu | G06Q 10/06 709/224 |
| 2008/0201542 A1* | 8/2008 | Maruyama | G06F 3/0607 711/165 |
| 2010/0115048 A1* | 5/2010 | Scahill | H04L 67/325 709/213 |
| 2010/0211529 A1* | 8/2010 | Neri | G06Q 40/00 705/36 R |

(Continued)

FOREIGN PATENT DOCUMENTS

WO 2013041587 A1 3/2013

OTHER PUBLICATIONS

Wikipedia, k-means clustering, retrieved on Sep. 13, 2018, https://en.wikipedia.org/wiki/K-means_clustering p. 1-14 (Year: 2018).*

*Primary Examiner* — Tonia L Dollinger
*Assistant Examiner* — Joseph M Cousins
(74) *Attorney, Agent, or Firm* — Morgan, Lewis & Bockius LLP

(57) ABSTRACT

Disclosed herein is a technique for predicting network availability and quality specific to particular types of networks over a particular period of time. The prediction of network availability and quality is based on usage patterns associated with a user of a user device (e.g., a mobile computing device). Based on the prediction, delay-tolerant operations can be efficiently scheduled at the user device.

23 Claims, 10 Drawing Sheets

(56) References Cited

U.S. PATENT DOCUMENTS

| | | | |
|---|---|---|---|
| 2013/0196685 A1 | 8/2013 | Griff et al. | |
| 2014/0056154 A1* | 2/2014 | Agarwal | H04W 4/029 370/252 |
| 2014/0280702 A1 | 9/2014 | Barker et al. | |
| 2015/0139074 A1* | 5/2015 | Bane | H04W 24/08 370/328 |
| 2015/0149591 A1* | 5/2015 | Gibbon | H04L 67/325 709/219 |
| 2015/0351037 A1* | 12/2015 | Brown | G06N 5/04 455/574 |
| 2016/0044129 A1* | 2/2016 | Bergmann | H04L 67/2847 455/406 |
| 2016/0241996 A1* | 8/2016 | Bourque | H04W 4/021 |

* cited by examiner

SYSTEM AND METHOD FOR PREDICTING CHANGES IN NETWORK QUALITY

CROSS-REFERENCE TO RELATED APPLICATIONS

The present application claims the benefit of U.S. Provisional Application No. 62/171,937, entitled "SYSTEM AND METHOD FOR PREDICTING CHANGES IN NETWORK QUALITY," filed Jun. 5, 2015, the content of which is incorporated herein by reference in its entirety for all purposes. The present application also claims the benefit of U.S. Provisional Application No. 62/172,201, entitled "SYSTEM AND METHOD FOR PREDICTING CHANGES IN NETWORK QUALITY," filed Jun. 7, 2015, the content of which is incorporated herein by reference in its entirety for all purposes.

FIELD

The described embodiments set forth a technique for predicting network availability and/or quality specific to particular kinds of networks.

BACKGROUND

Generally, a user performs various types of activities using his/her user device. Certain types of activities consume considerable amounts of battery power and can result in increased costs for the user (e.g., when the activities cause large amounts of data to be transferred over cellular networks). Moreover, performing the activities when network quality is poor can result in loss of data packets while exacerbating the problem of battery power usage. This can degrade the performance of the user device and the user's overall satisfaction with the process. Consequently, there is a need for a system that is capable of predicting network availability/quality for purposes of scheduling certain types of activities on the user device.

SUMMARY

Representative embodiments set forth herein disclose various techniques for predicting network availability and quality over a particular period of time (e.g., 24 hours). In particular, the embodiments set forth various techniques for predicting network availability and quality specific to particular types of networks (e.g., cellular network, WiFi network, etc.) for purposes of scheduling delay-tolerant operations at a user device. The delay-tolerant operations can include operations that can be performed within a reasonable amount of time (e.g., 24 hours) and do not need to be performed immediately. Based on the predictions of network availability and quality, an opportune time to perform a particular delay-tolerant operation can be identified. For example, when the predictions indicate that a high quality WiFi network will be available at a certain time in the future (rather than a currently available low quality cellular network, for example), the delay-tolerant operation can be scheduled to take place at the future time. By performing the delay-tolerant operation at a time when a high-quality network is available, user satisfaction can be maximized while extending battery power and avoiding increased data usage costs.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for formulating network availability and quality predictions that can be used to opportunistically schedule delay-tolerant operations at a user device. In particular, phases of good, poor, or no network connectivity associated with particular types of networks (e.g., cellular network, WiFi network, etc.) can be predicted up to 24 hours in the future. The predictions are based on usage patterns associated with a user of the user device. A usage pattern can include a pattern of network availability specific to the particular types of networks used by the user. In particular, the usage pattern includes a user's history of usage pertaining to the particular types of networks and the networks' service record or quality over time. Based on the predictions, an opportune time to schedule the delay-tolerant operations can be identified.

Accordingly, the techniques described herein provide a mechanism for predicting network availability and quality specific to particular types of networks for purposes of scheduling delay-tolerant operations at the user device. A more detailed discussion of these techniques is set forth below and described in conjunction with FIGS. 1-10, which illustrate detailed diagrams of systems and methods that can be used to implement these techniques.

Figure 1:
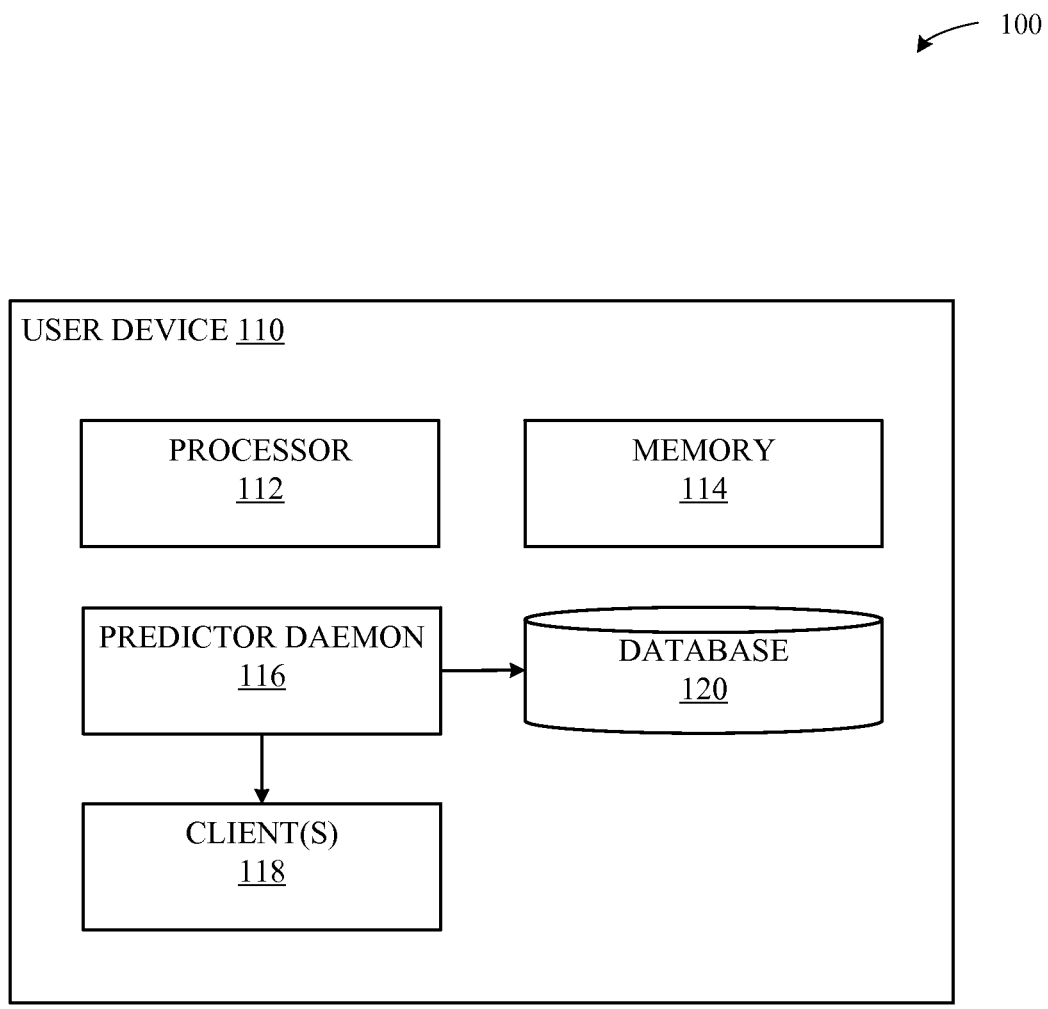
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a mobile computing device (e.g., an iPhone®, an iPad®, or other any other mobile computing device by Apple®). A processor 112, in conjunction with the memory 114, can implement an operating system (OS) (e.g., iOS by Apple®) that is configured to execute various applications (e.g., native OS applications and user applications), daemons, and other processes/services on the user device 110. Daemons include processes that run as a background process rather than under direct control of the user of the user device 110.

As shown in FIG. 1, the user device 110 can include a predictor daemon 116, a number of clients 118, and a database 120 coupled to the predictor daemon 116. The predictor daemon 116 represents a process that generates network availability and quality predictions, provides the predictions to the database 120 for storage, and communicates the predictions to the client(s) 118, on demand. The predictor daemon 116 can generate predictions of when a particular network will have specific properties (e.g., a high quality network or a low quality network) in the near future (e.g., in 24 hours or less). The client(s) 118 can include daemons or processes with supervisory duties that use the predictions to schedule delay-tolerant operations or to determine an appropriate time to perform the delay-tolerant operations. The delay-tolerant operations (also referred to as, background or discretionary operations) can include operations that can be performed within a reasonable amount of time prior to a particular deadline (e.g., within 24 hours). The delay-tolerant operations can include synchronizing operations (e.g., synchronizing bookmarks associated with the user device 110, synchronizing documents with a cloud-based storage system, etc.), updating operations (e.g., updating pictures), and the like. According to one embodiment, any high-priority operations that involve user interaction (e.g., visiting a website) and that need to take place immediately are not categorized as delay-tolerant operations.

According to some embodiments, when a particular delay-tolerant operation is to be performed, the client(s) 118 can request the predictor daemon 116 for a prediction to identify an opportune time to perform the operation. For example, when the prediction indicates that a high quality network (e.g., WiFi network) will be available in two hours, the client(s) 118 can schedule the operation to be performed in two hours if the deadline for the operation will be met. Because the WiFi network typically consumes less power than a cellular network (that the user device 110 may be currently connected to), battery power of the user device 110 can be conserved. Also, data usage costs can be significantly reduced when the WiFi network is used instead of the cellular network. As such, the predictions provided by the predictor daemon 116 allow client(s) 118 to skirt episodes of marginal or unstable network connectivity/availability, which would result in doomed network transactions needlessly wasting system resources and power.

According to one embodiment, the client(s) 118 can include a network daemon that receives a request to perform a particular operation, where the request includes a deadline for the operation (e.g., a one-day deadline). The network daemon can, in turn, interact with the predictor daemon 116 to receive predictions regarding an opportune time to perform the particular operation. For example, a newsstand application installed on the user device 110, which presents the users' favorite magazines, can indicate to a transfer daemon (not illustrated in FIG. 1) implemented by the user device 110 that a transfer of magazines needs to be performed once a day. The transfer daemon can represent a process that manages data transfers in the background. The newsstand application can provide the URL and the deadline (i.e., one day) to the transfer daemon. The transfer daemon, in turn, communicates with the network daemon (e.g., client 118) to indicate that the particular transfer operation has a deadline of one day. The network daemon interacts with the predictor daemon 116 to receive the network availability and quality predictions for the next 24 hours that can be used to schedule the particular transfer operation. Other applications or processes (e.g., Pictures application, iCloud™ application, or other applications) can similarly communicate with transfer daemon (that in turn communicates with the network daemon) for purposes of receiving the predictions, as will be appreciated.

According to one embodiment, the client(s) 118 can include a daemon that gathers information from the user device 110 to make predictions regarding future behavior of the user device 110 (pertaining to power management, for example). For instance, when battery power of the user device 110 needs to be preserved (e.g., because only 5% battery power is remaining), the client(s) 118 can interact with the predictor daemon 116 to receive a prediction regarding when a delay-tolerant operation can be performed. For example, the prediction can indicate that a high-quality WiFi network (e.g., home network) will not be available for three hours. The client(s) 118 can then use the prediction to perform the operation when the user device 110 is connected to the home network (because the user can also charge the user device 110 at home).

Figure 2:
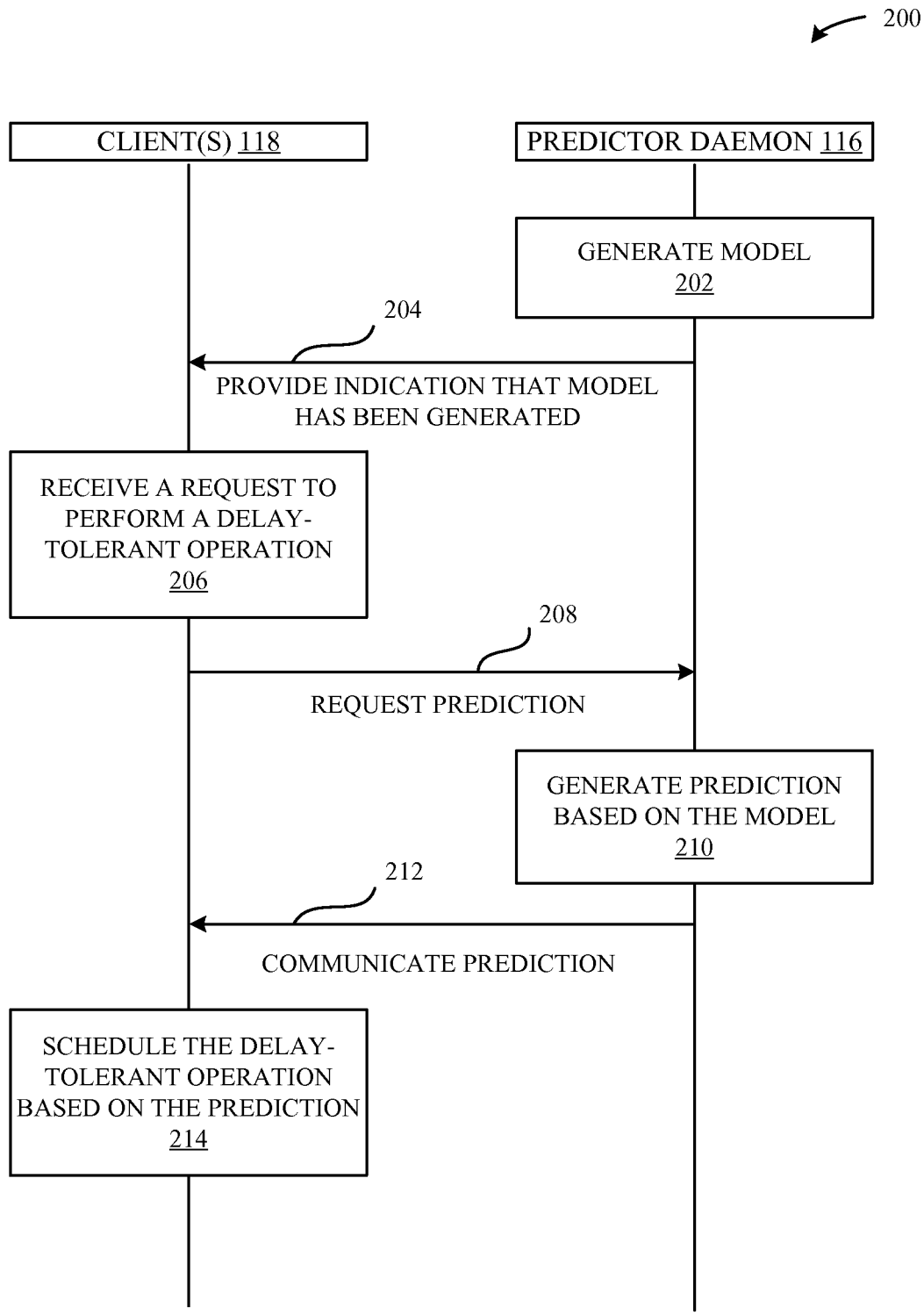
FIG. 2 illustrates a sequence diagram of a method for scheduling delay-tolerant operations that is performed by various components of a user device of FIG. 1, according to some embodiments.

FIG. 2 illustrates a sequence diagram of a method 200 for scheduling delay-tolerant operations that is performed by various components of the user device 110, according to some embodiments. As shown in FIG. 2, at step 202, the predictor daemon 116 generates a model based on usage patterns associated with the user of the user device 110. The usage pattern can include a pattern of network availability and quality specific to particular types of networks (e.g., cellular network, WiFi network, etc.) used by the user. According to some embodiments, the usage pattern includes the user's history of using the particular types of networks at various times during a day (according to the user's daily routine) and the networks' service record over time. For example, the user may use a strong home network (e.g., the user device 110 may be connected to a home WiFi network) in the early morning hours, the user may not have access to a WiFi network but have access to a cellular network while commuting to/from work, the user may use a strong work network during work hours, and so on. According to some embodiments, the predictor daemon 116 utilizes machine learning techniques to generate the model based on the usage patterns.

At step 204, the predictor daemon 116 provides an indication to each of the client(s) 118 that a model has been generated by the predictor daemon 116. At step 206, a client 118 receives a request to perform a delay-tolerant operation. In response to the request, at step 208, the client 118 requests the predictor daemon 116 for a prediction of network availability and/or quality (e.g., for the next 24 hours) that can be used to efficiently schedule the delay-tolerant operation. According to some embodiments, the client 118 can utilize an application program interface (API) command to query the predictor daemon 116 for the prediction. At step 210, the predictor daemon 116 generates the prediction based on the model. According to some embodiments, the prediction can include indications of when a particular type of network (e.g., WiFi or cellular network) will be available and/or when transitions in network quality take place. According to some embodiments, the prediction can include indications of when a transition from a first network quality (e.g., high quality) to a second network quality (e.g., low quality) will take place, the second network quality transitioned to, and a confidence of the prediction.

Figure 3:
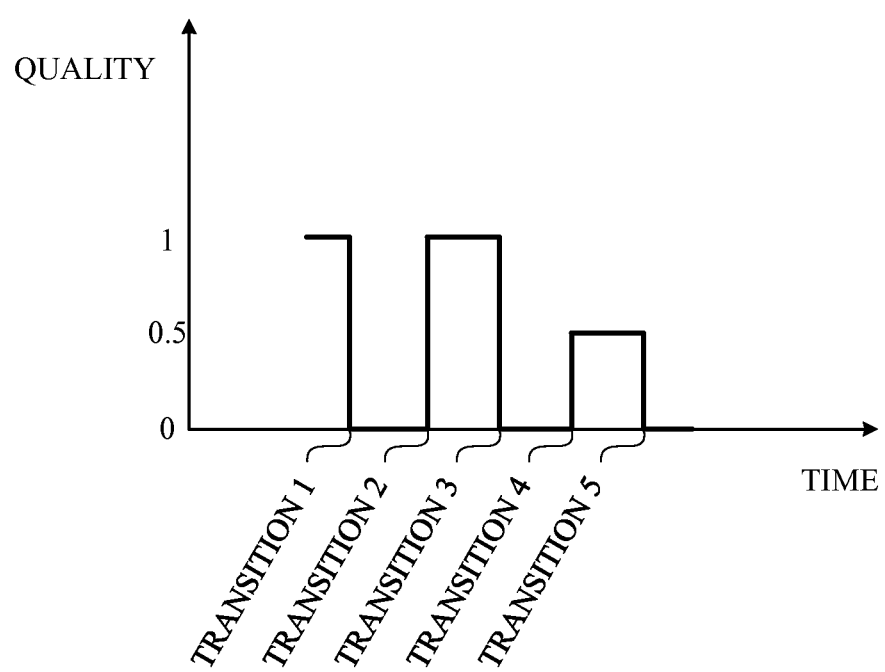
FIG. 3 illustrates an exemplary graph that depicts network quality that is predicted by a predictor daemon implemented by the user device of FIG. 1, according to some embodiments.

FIG. 3 illustrates a graph 300 that depicts predicted network quality (as predicted by the predictor daemon 116). The network quality dimension is discretized to three levels (e.g., 1 for good quality, 0.5 for poor quality, or 0 for no network connectivity). The time dimension is discretized to either five or fifteen minute intervals. According to some embodiments, the prediction provided by the predictor daemon 116 includes an array of data regarding various transitions in network quality, where each element of the array specifies-1) a time that a particular transition (e.g., transitions 1, 2, 3, 4, and 5 depicted in FIG. 3) will take place, 2) the network quality transitioned to (e.g., for "transition 1", the network quality transitioned to is 0 for "no network connectivity"), and 3) a confidence of the prediction.

Referring back to FIG. 2, at step 212, the predictor daemon 116 communicates the prediction to the client 118. In turn, the client 118 schedules the delay-tolerant operation based on the prediction provided by the predictor daemon 116, at step 214. The client 118 can, based on the prediction, identify a time when the delay-tolerant operation can be performed. For example, based on the prediction, the client 118 can determine that the delay-tolerant operation can be scheduled when "transition 2" of FIG. 3 takes place because the transition results in a good quality network.

Figure 4:
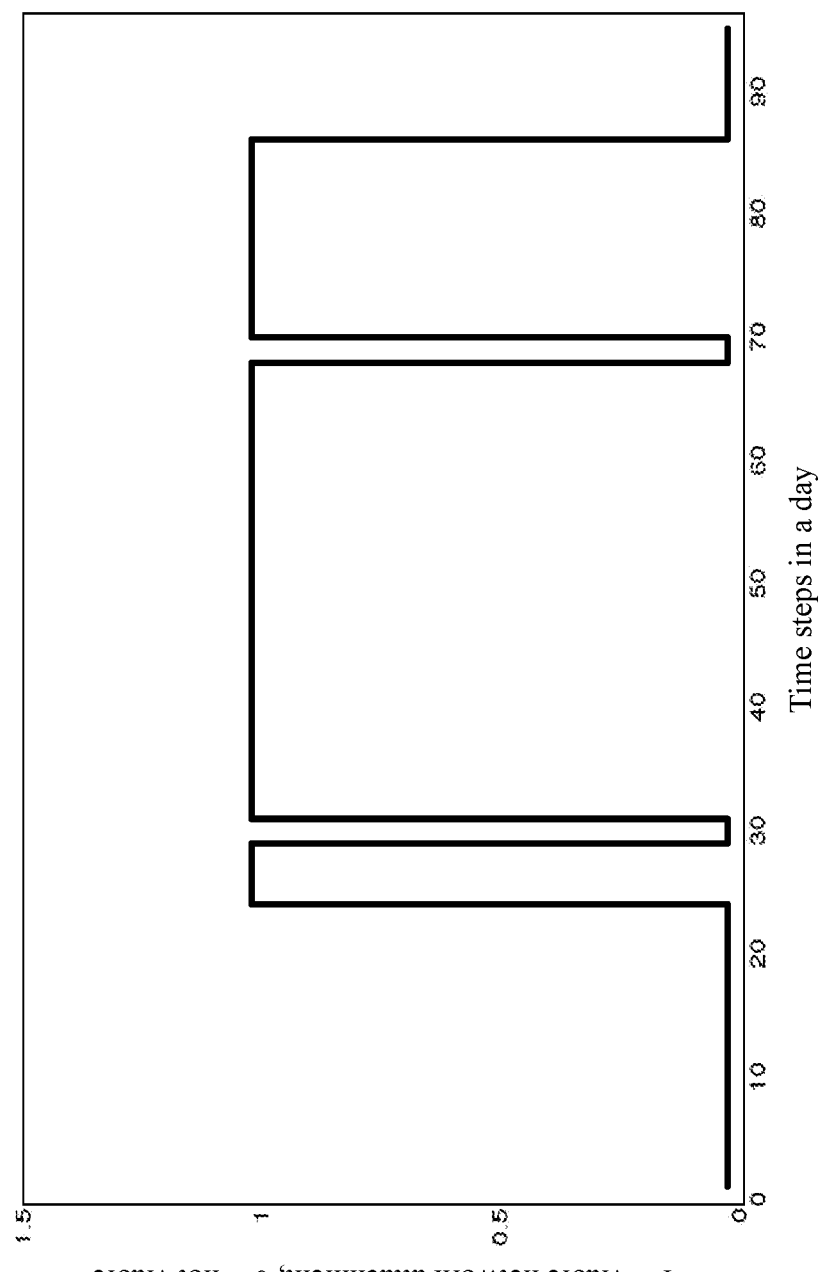
FIG. 4 illustrates an exemplary graph that depicts network availability and quality data gathered from the user device of FIG. 1, according to some embodiments.

FIG. 4 illustrates a graph 400 that depicts network availability and quality data gathered from the user device 110 over a period of time (e.g., 24 hours). The graph can represent the user's usage of particular types of networks and the quality of the networks at various times during the 24 hours (according to the user's daily routine, for example). The quality dimension is discretized to either two levels (e.g., viable network available or not available) or three levels (e.g., good, poor, or no connectivity/availability), and the time dimension is discretized to either five or fifteen minute intervals. The user's routine and network quality can be contextualized as follows: 1) phone lies on nightstand with low quality WiFi connectivity (<−80 dBm) at night, 2) strong home network (e.g., home WiFi network) available during early morning hours, 3) no WiFi connectivity available during commute to work, 4) strong work network available during work hours, 5) no WiFi connectivity available during commute from work, and 6) strong home network available during evening hours. According to some embodiments, the network availability data/usage pattern data can be collected for a number of days. It will be understood that the data can indicate similar or different patterns for different days.

According to some embodiments, the predictions generated by the predictor daemon 116 stem from modeling and machine learning algorithms/techniques. The network availability data can be fed into supervised and/or unsupervised machine learning algorithms (implemented by the predictor daemon 116) that analyze the data, recognize patterns, and generate models that can be utilized to provide the predictions (at step 210 of FIG. 2, for example).

According to some embodiments, for a particular machine learning algorithm, training data, cross-validation (CV) data, and test data are synthesized based on the network availability data. The data is synthesized while mixing in variations, such as, 1) cyclical noise (e.g., sleep-in on Wednesdays), 2) noise pushing edges +/−1 time slot (pseudorandom incidence, e.g., road traffic; still, all permutations are included in the training data), and 3) noise signatures with more pronounced peaks/valleys (i.e., all permutations do not possibly fit into the training data). Based on the graph of FIG. 4, the synthesized data shows a balanced mix of good network quality versus bad network quality outcomes. However, there may be cases in real life where the distribution is highly skewed, such that either the good quality or the bad quality outcomes are anomalies that can be handled via anomaly detection techniques. The synthesized data can be applied to supervised and/or unsupervised learning algorithms where N-step prediction error vs noise types/signatures can be characterized for each algorithm.

According to some embodiments, a supervised machine learning technique (e.g., Support Vector Machine (SVM)) can be utilized to perform time series prediction based on the network availability data/synthesized data. A two-class classification is used (i.e., 1 for good network quality, and 0 for poor network quality or no network, as shown in FIG. 4, for example). It will be understood that multi-class classification (e.g., 2 for good network quality, 1 for poor network quality, and 0 for no network) can be used without departing from the scope of this disclosure.

The SVM works best with: 1) autoscaling, 2) polynomial kernel function, and 3) least squares (LS) method. For each sample, four types of features can be used based on the network availability data/synthesized data. The features can include-1) day of the week information that is encoded as a binary-valued vector (resulting in seven features), 2) epoch of the day information (one of: early morning, late morning, afternoon, and evening) that is encoded as a binary-valued vector (resulting in four features), 3) R representing a number of regressors reflecting the outcome (observed or predicted outcome) at past times, i.e., at time $(-1)*J*T$ for regressor Rj (resulting in total R features), and 4) a count of the last same-value regressors, as a measure of sojourn time in the same state (resulting in one feature).

In an N-step prediction, a random starting point in CV data is selected. Using the selection as an initial state, a 1-step prediction is performed. The prediction is made a feature of the next sample (while shifting the other regressors by one slot) and the next 1-step prediction is performed up to the Nth prediction. This loop can feed itself for an arbitrary number of N, albeit with increasing exposure to errors. Notably, a missed prediction at step N is a feature (regressor) in the N+1 prediction and will be a feature for the subsequent R steps (R being the number of regressors).

The fidelity of the N-step prediction is characterized by computing the mean squared error (MSE) based on a vector of predicted values and a vector of actual matching values in the CV data. Given than some variability exists due to the starting point and the noise elements encountered, Mx independent N-step predictions off of different CV data are performed, and a mean, var MSE over the Mx MSEs is reported. Also, the N-step prediction error can be characterized in terms of minutes of wall-clock elapsed time based on the equation: $MSE*(60/T)*N*T$.

According to some embodiments, different features can contribute differently to the MSE when applied to noisy samples. Certain features may need to be suppressed from the training data and the CV data. For example, the day of the week features and the epoch of the day features can be useful when the number of regressors is small (e.g., around 15). However, these features become a distraction when the number of regressors is higher (e.g., around 60). As a result, these features can be suppressed from the training and CV data used in any subsequent tests.

According to some embodiments, a supervised machine learning technique (e.g., Hidden Semi-Markov Model (HSMM)) can be utilized to generate models for providing predictions. HSMM can capture temporal and causal dependencies in the user's own routine. Features associated with the HSMM can include-1) state sojourn distribution that represents the probability of spending (u) consecutive time steps in state (i), which can be defined in either parametric form (e.g., Poisson) or non-parametric form (i.e., matrix), 2) a choice of training the model while locking either transition matrix or state sojourn distribution, and 3) multivariate emission distributions, if needed, to reflect multiple concurrent observations.

To assess learnability and model fidelity, the following steps (1-6) can be performed:

1) The synthesized training data described above is utilized. For emissions, continuous values representing RSSI levels are sampled coarsely to fall into three specific, easily identifiable ranges-good (~-35 dBm), poor (~-80 dBm), bad or none (~-95 dBm). Conversely, based on FIG. 4, these ranges can be discretized to 1 or 0 for above or below viability threshold and discretized time (T=15 minutes) can be used.

2) When performing HSMM parameter estimation, the a-priori knowledge can be limited in accordance with the information: 1) initial number of states=3, 2) time slots in a day=96, 3) initial sojourn density=uniform, 4) initial transition matrix =equal probability to reach each state, and 5) emission levels=3 levels. A state has an initial probability of 1.0 to emit at a level that is different than the other states.

Figure 5:
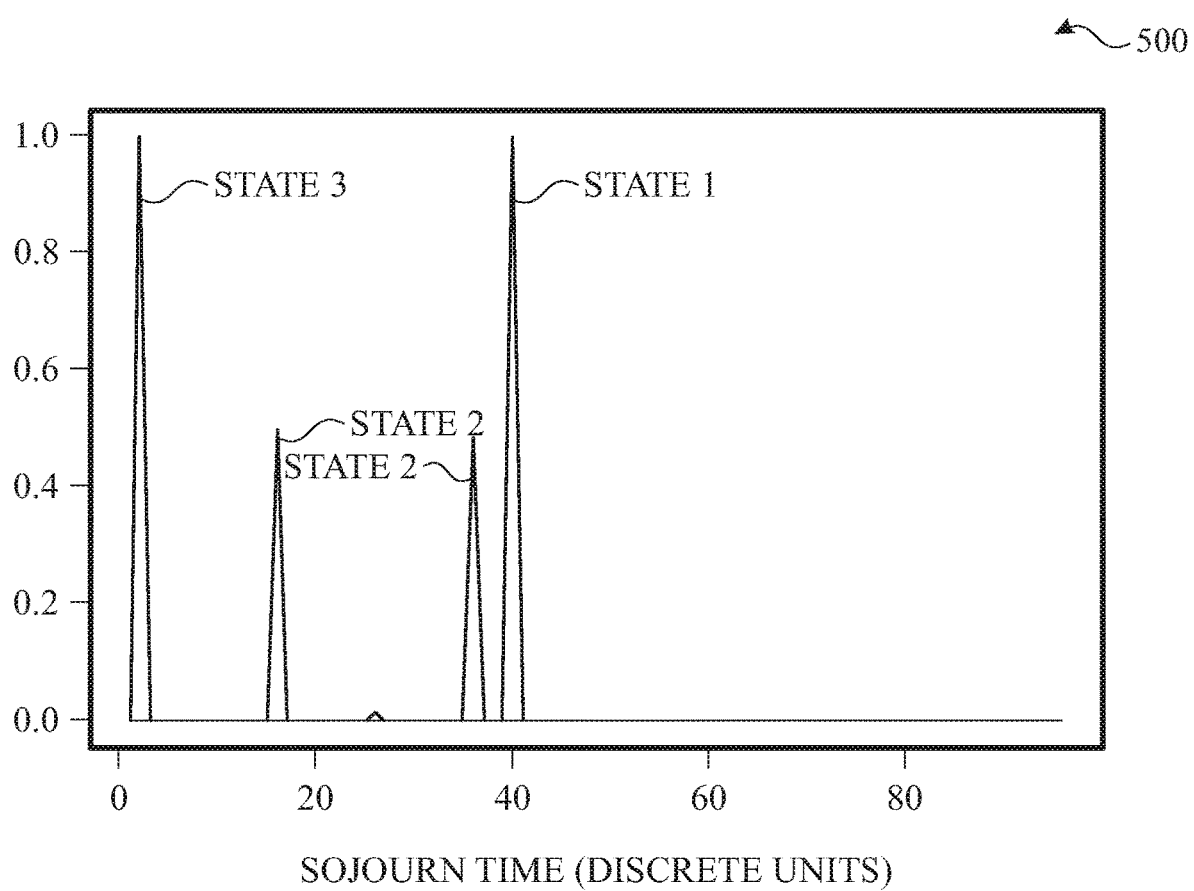
FIG. 5 illustrates an exemplary graph that depicts a state sojourn distribution for a Hidden Semi-Markov Model, according to some embodiments.

3) HSMM is fit without locking on the sojourn matrix and the resulting state sojourn distribution is evaluated. For example, FIG. 5 illustrates a graph 500 that depicts the state sojourn distribution. As shown in FIG. 5, one hidden state (e.g., state 2) is used with two distinct sojourn times (around 16 slots and 38 slots, respectively). Thus, the choice of which sojourn time is being applied while in this hidden state can be ambiguous. For greater delineation, the fitting algorithm can split the hidden state (state 2) into two distinct states, each featuring a single cusp for its unambiguous sojourn distribution. When every state has its own unambiguous sojourn time distribution, the state sojourn distribution can be locked. This iterative process can be automatically performed for every state with ambiguous sojourn time distributions.

4) With the sojourn matrix locked, the HSMM is fit again with the same training data, resulting in a new state transition matrix. Similar to step 3) for the sojourn matrix, the new state transition matrix is traversed while identifying transitions that equally split and would benefit from adding an extra hidden state.

5) Emissions are simulated out of the fitted HSMM model to assess model fidelity. The emissions (i.e., learned pattern which is bootstrapped from minimal a-priori knowledge) closely track the shape of FIG. 4. Compared to FIG. 4, there may be an initial phase shift of a number of slots, which stems from the HSMM initial state variable when simulation started. In other words, the learned pattern matches the shape of FIG. 4 excluding the initial time slots that stem from earlier model memory.

6) The model fit is quantitatively expressed in terms of MSE between predicted and measured network quality in the presence of different signal patterns and noise levels.

According to some embodiments, an unsupervised machine learning algorithm (e.g., k-means clustering) can be utilized to generate models for providing predictions. Using this algorithm, episodes of sub-par network quality are clustered. The outcome of the clustering results in a set of centroids in the [time of the day, day of the week] space that can be considered the focal points of networking trouble. The probability of sub-par network quality decreases when moving away from these centroids. Unlike the SVM and HSMM approaches, the data fed into the clustering algorithm only includes data regarding network impairment (e.g., poor/bad network quality or no network connectivity) and the length of the network impairment. An individual data sample can represent a departure from the norm, which is defined as having an optimal network (24 hours a day, 7 days a week). Such a data sample can have the following features: 1) day of the week the episode started, 2) time of the day the episode started (in discrete time, typically a 5 or 15 minute slot), 3) a level of network impairment (e.g., 1 for fatal impairment (i.e., no connectivity), and 2 for non-fatal impairment (i.e., poor connectivity), and 4) duration of impairment (in discrete time, the duration amounts to the number of slots the level of network impairment is held). According to some embodiments, a weighing mechanism can be applied such that a data sample pertaining to a current week weighs more than a data sample pertaining to past weeks (e.g., past three weeks).

The k-means clustering approach involves a number of iterations. For the iterations, the following steps (1-8) can be performed:

1) Randomize all data entries for a particular time frame to be learned (e.g., a 4-week window).

2) Bin the data entries based on the day of the week (e.g., 7 bins).

3) For each of the bins, apply k-means clustering for values of "k" in the range [2 .. 10], where "k" represents a number of clusters.

Figure 7:
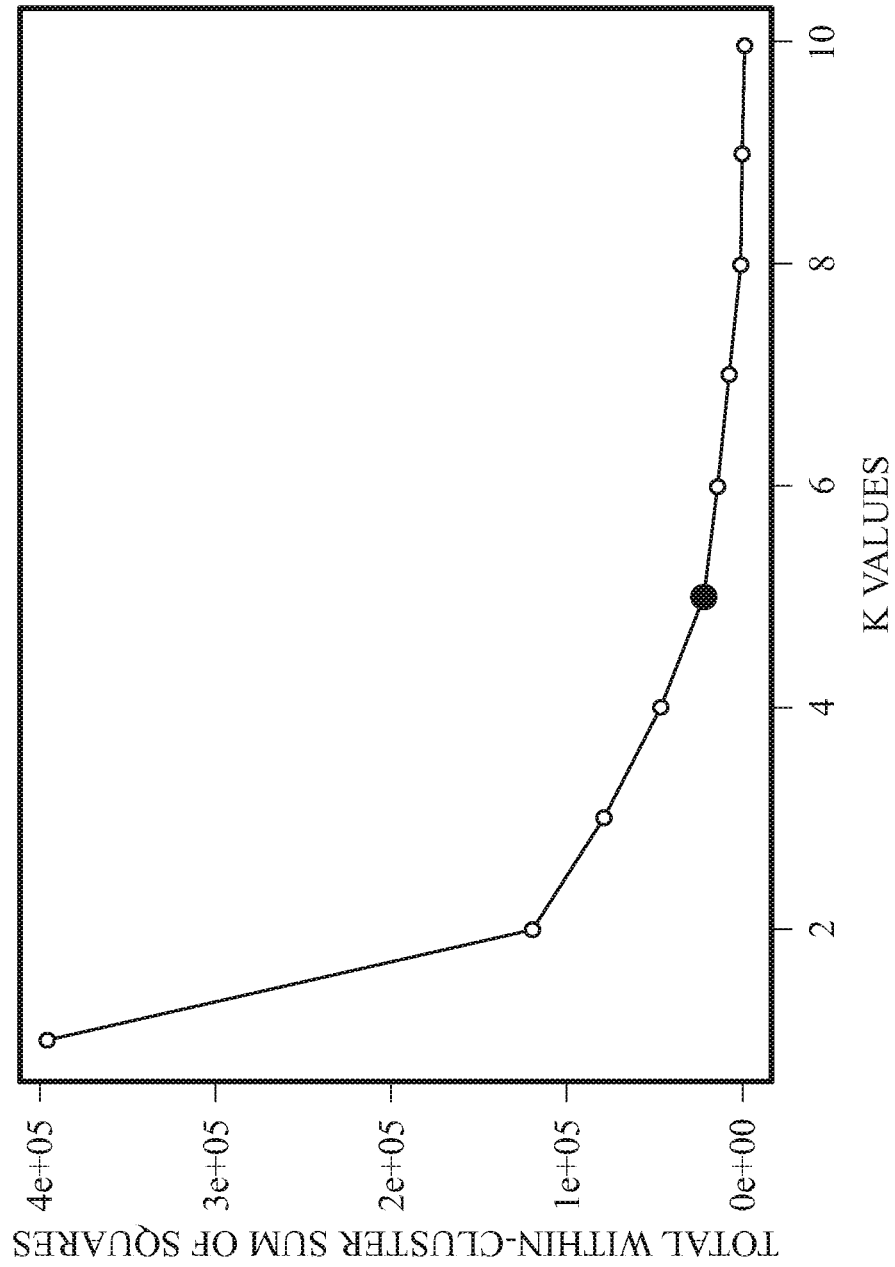
FIG. 7 illustrates an exemplary graph that depicts selection of an optimal number of clusters for a distribution in a k-means clustering technique, according to some embodiments.

4) To determine the optimal value of "k" for each bin, "elbow" the curve of total within-cluster sum of squares vs. "k". Programmatically, the "elbow" of the curve can be detected by approximating the $2^{nd}$ derivative of the curve and identifying its highest relative increment when moving from highest "k" to lowest "k". FIG. 7 illustrates a graph 700 that depicts a selection of an optimal "k" for a distribution.

5) For a given bin, record the optimal "k" and the centroids resulting from that specific k-means run.

6) The distribution of all seven sets of centroids (from step 5) is taken as a new distribution, and steps 3) and 4) are performed again on the new distribution. This results in a new optimal "k" that is specific to that distribution ("week-k").

7) Given the optimal "week-k", the individual days of the week are analyzed to determine how the individual days of the week map to the "week-k" centroids. Programmatically, a matrix can be built where a row is the day of the week and a column is a centroid among the optimal "week-k". From the matrix, a distance matrix can be derived that is computed by using the Euclidean distance between the rows of the matrix. In the distance matrix, a zero value designates that the days in the row and column number can be approximated as having a same "day style".

8) With the information collected in step 7, a scoped dimensionality reduction around the day of the week feature can be performed and the days with similar network quality pattern can be grouped into the same "day style". In a worst case scenario, seven different "day styles" can be generated, but most likely, fewer than seven "day styles" will be generated.

Figure 8:
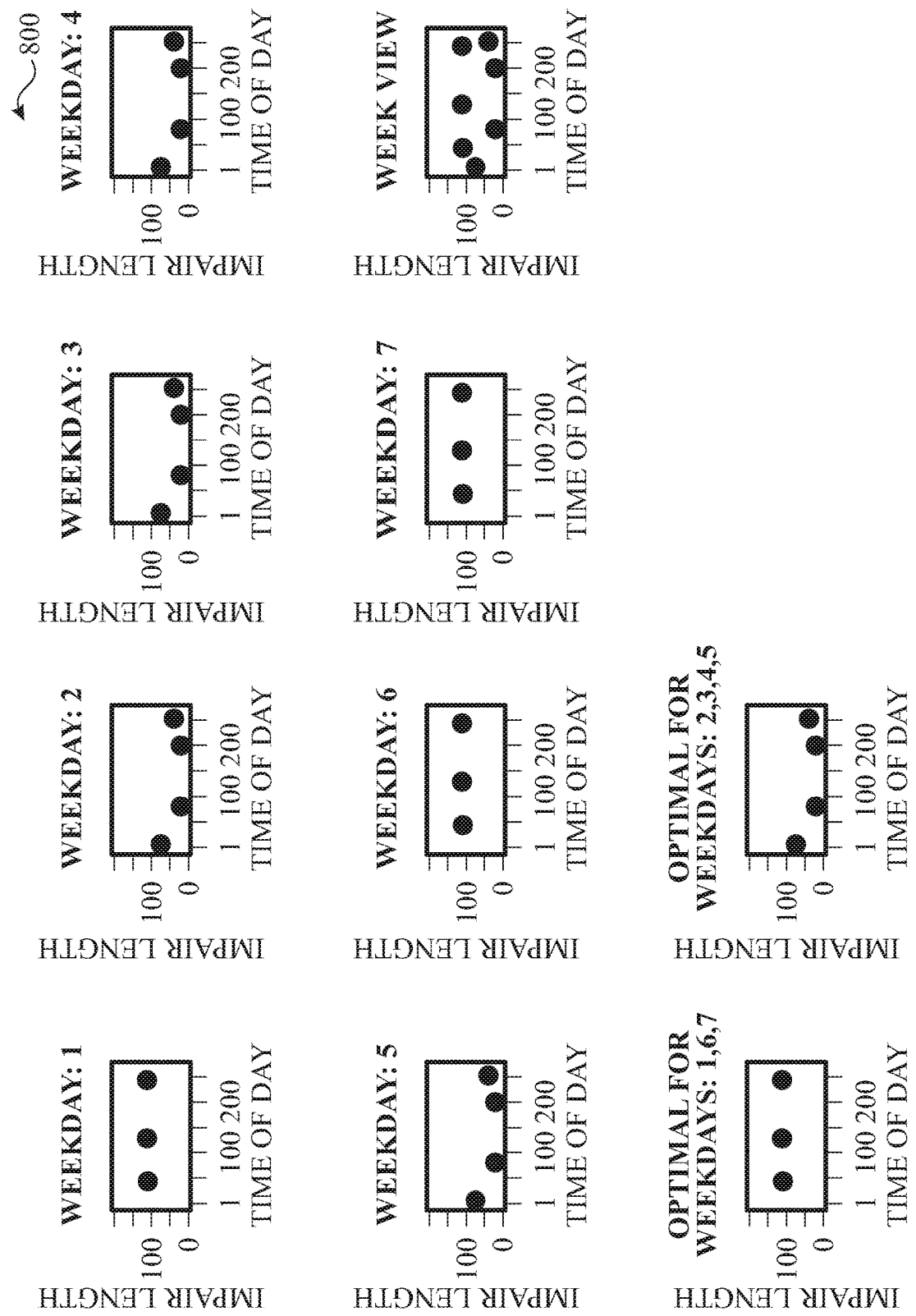
FIG. 8 illustrates an exemplary graph that depicts various stages in the k-means clustering technique, according to some embodiments.

FIG. 8 illustrates a graph 800 that depicts various stages in the k-means clustering approach (with regard to steps 1-8 described above). Each smaller graph in FIG. 8 shows discrete time of day (5 minute slots) in the X axis and a length of impairment (5 minute slots) in the Y axis. From left to right, the first seven graphs pertain to day of the week 1-7 (i.e., Monday-Sunday). These graphs result from the execution of steps 1-5 described above. Various different clusters are shown in each graph, where the centroids of the clusters are identified by a star point. The "week view" graph is generated based on execution of steps 6-7. The bottommost two graphs capture the learning (from step 8). In particular, one of the bottommost graphs depicts that weekdays 1, 6, 7 (i.e., Monday, Saturday, and Sunday) are patterned in a similar manner (i.e., the approximate length of the impairments and the approximate time at which the impairments take place is similar) and can be processed as a single "day style" (referred to as "day style 1"). Similarly, the other bottommost graph depicts that weekdays 2-5 (i.e., Tuesday-Friday) are patterned in a similar manner and can be processed as a single "day style" (referred to as "day style 2"). As such, days with similar network quality pattern are grouped into the same "day style", which results in a total of two "day styles".

Figure 6:
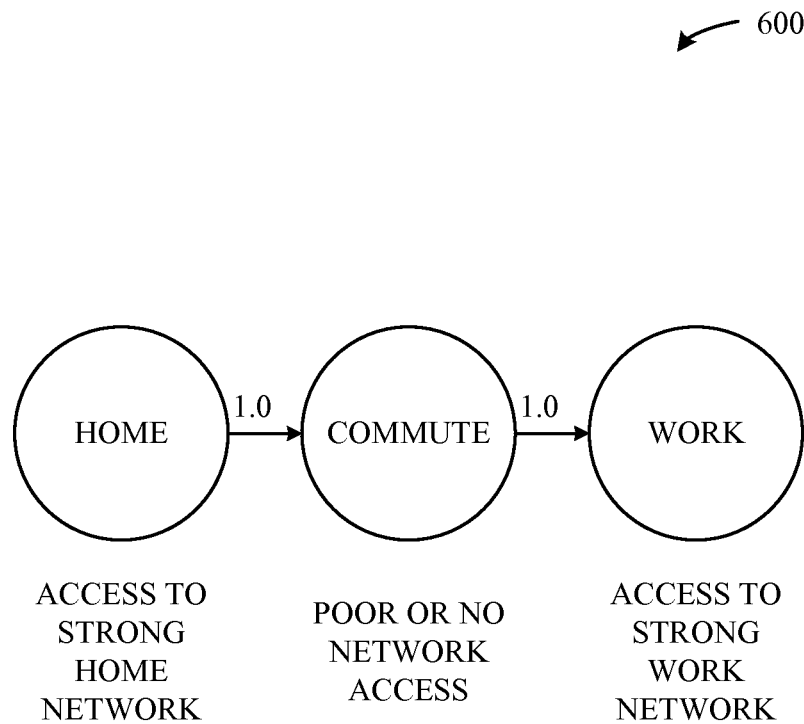
FIG. 6 illustrates an exemplary graph that maps transitions between different states for the Hidden Semi-Markov Model, according to some embodiments.

In some cases, certain events may follow the same sequence that is followed by events associated with a particular "day style"; however, these certain events may not be captured by the clustering approach. For example, a user may follow a first sequence in which he/she is at home early in the morning (where the user has access to a strong home network), starts his/her commute to work at 8AM (where the user has no access to a network), and reaches work at 9AM (where the user has access to a strong work network). This first sequence is captured in the $1^{st}$ cluster of "day style 1". However, the user can start his/her commute at 10AM on a particular Monday (instead of 8AM) following the same first sequence as above, but this second sequence will be missed by the clustering approach and not applied to "day style 1". To recover from this scenario, a graph (as shown in FIG. 6, for example) is generated and monitored in addition to the unsupervised clustering approach in order to capture such a scenario. FIG. 6 represents a Markov Model and is a trivial realization of the HSMM approach. A graph 600 of FIG. 6 maps transitions between different states and the probabilities associated with the various state changes can be referred to as transition probabilities. The graph 600 includes a number of nodes, where a first node represents a first state that indicates that the user is at home and has access to a strong home network, a second node represents a second state that indicates that the user is commuting to work and has poor or no network access, and a third node represents a third state that indicates that the user is at work and has access to a strong work network. The probability associated with each state is 1.0. According to some embodiments, the unsupervised clustering approach in combination with the graphing illustrated in FIG. 6 is used to identify the second sequence (that has all 1.0 probability transitions, for example). According to some embodiments, a number of network transitions are continuously graphed and monitored to identify the second sequence (that has little variance) from the transitions. When the second sequence is identified, the unsupervised clustering is suspended and an override is applied to capture the second sequence. According to some embodiments, the override is applied when a threshold pertaining to a number of hops is satisfied. For example, when at least two hops in the second sequence are identified, the override can be applied.

According to some embodiments, data associated with each node in the graph (e.g., graph of FIG. 6 which is also maintained in the clustering approach) is tied to a particular network. Unique identifiers can be used to identify the networks. For example, a service set identifier (SSID) or basic service set identifier (BSSID) can be used to identify a WiFi network, a cell tower identifier (Tower ID) can be used to identify a cellular network, and so on. Additional information (e.g., location information) can be also be used as would be appreciated. According to some embodiments, a particular node in the graph is established after the user device 110 remains connected to a particular network (that is represented by the node) for a particular amount of time (e.g., 15 minutes).

According to some embodiments, any of the above-described machine learning techniques can be implemented by the predictor daemon 116. The machine learning techniques can take as input the network availability/quality data, perform feature extraction to identify features that can be used to describe the data in each sample, and perform model fitting to select a model that yields accurate predictions with low error. While SVM, HSMM, and k-means clustering techniques are described herein, any other machine learning techniques can be implemented to generate the predictions for the client(s) 118. In addition, any of the machine learning techniques can be implemented at the user device 110 without requiring an interaction with or implementation at a remote server (e.g., any server in a data center), and the network availability/quality data is not dependent on data collected from other users. These features can allay privacy concerns that other predictive solutions are subject to.

Figure 9:
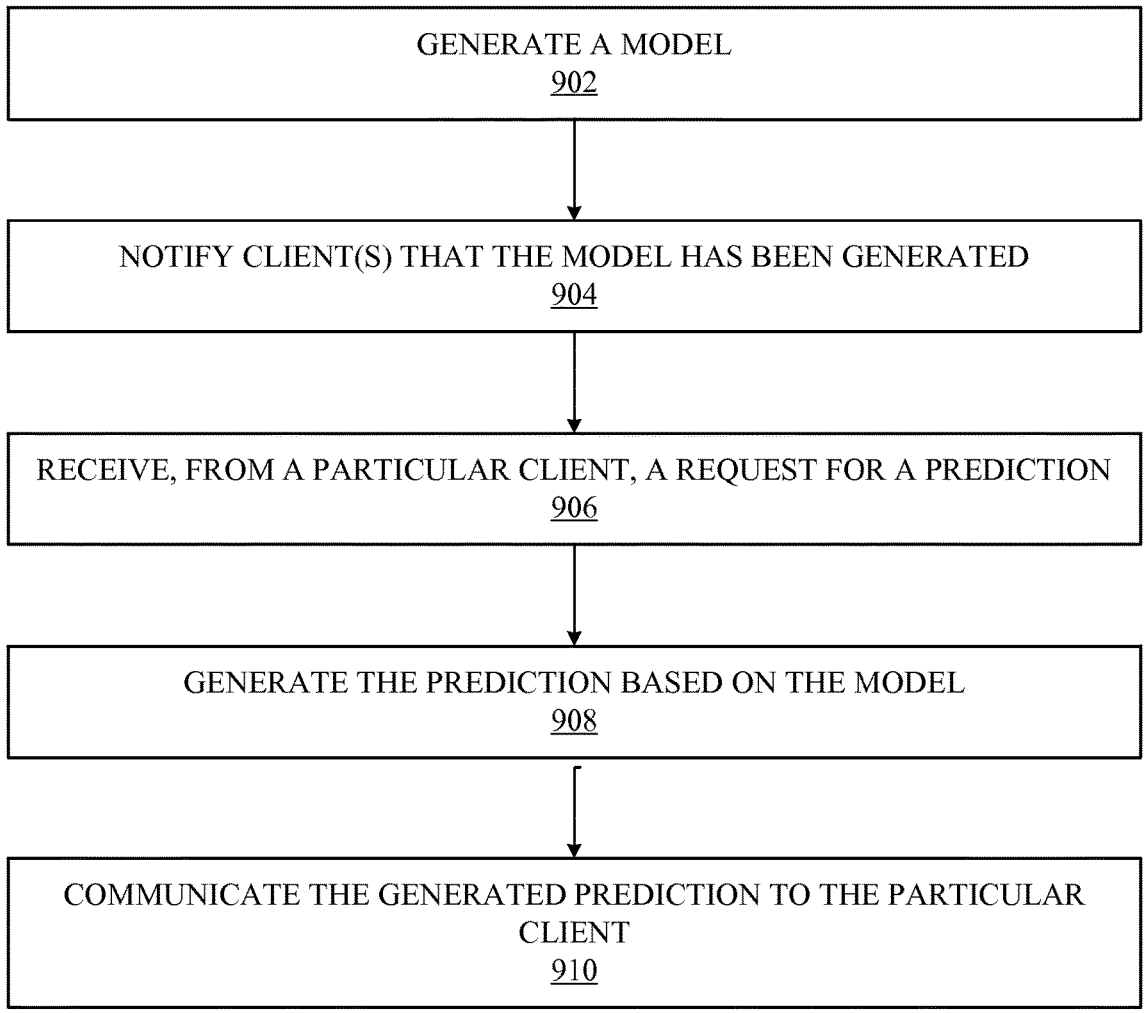
FIG. 9 illustrates a method that is carried out by the predictor daemon implemented by the user device of FIG. 1, according to one embodiment.

FIG. 9 illustrates a method 900 that is carried out by the predictor daemon 116 implemented by the user device 110 of FIG. 1, according to one embodiment. As shown, the method 900 begins at step 902, where the predictor daemon 116 generates a model. The model is generated based on usage patterns associated with the user of the user device 110. The usage pattern can include a pattern of network availability and quality specific to particular types of networks (e.g., cellular network, WiFi network, etc.) that the user device 110 is connected to. According to some embodiments, the predictor daemon 116 utilizes machine learning techniques to generate the model. At step 904, the predictor daemon 116 notifies the client(s) 118 that the model has been generated.

At step 906, the predictor daemon 116 receives a request for a prediction of network availability and/or quality from a particular client 118. The particular client 118 requests the predictor daemon 116 for a prediction that is valid for the next 24 hours, such that the prediction can be used to efficiently schedule any delay-tolerant operations at the user device 110.

At step 908, the predictor daemon 116 generates the prediction based on the model. The prediction can include information regarding when a particular type of network (e.g., WiFi or cellular network) will be available and/or when transitions in network quality take place. According to one embodiment, when the particular client 118 requests the prediction, the predictor daemon 116 can utilize the model that is generated by the machine learning techniques (e.g., "day style" model generated by the k-means clustering technique) to generate the prediction. For example, based on the current day of the week (e.g., Monday), the predictor daemon 116 can determine a particular "day style" that applies (e.g., "day style 1"). Based on the determined "day style", the predictor daemon 116 can determine periods/times when there is "no network impairment" (i.e., transitions to periods of good connectivity). At step 910, the predictor daemon 116 can provide the prediction to the client 118, where the prediction can include information regarding the determined periods of "no network impairment" so that the client 118 can schedule any delay-tolerant operations during those periods.

According to some embodiments, the predictor daemon 116 notifies the client(s) 118 each time a new model is generated. Certain conditions (e.g., time zone change, an override, or other significant change) can cause the predictor daemon 116 to generate a new model. For example, when a user travels to a new destination (resulting in the time zone change), the existing model does not apply and a new model is generated. However, the new model may not be able to generate any predictions because no data is available for the new destination. In this case, when the client(s) 118 request the predictor daemon 116 for a prediction, the predictor daemon 116 returns no predictions. When no predictions are returned, the client(s) 118 can determine that they cannot get predictions until another model is generated. According to some embodiments, the conditions where an existing model does not apply can be detected, where the predictor daemon 116 can generate a new model and the client(s) can revert to a state of not requesting the predictor daemon 116 for predictions at least until another model is generated.

Figure 10:
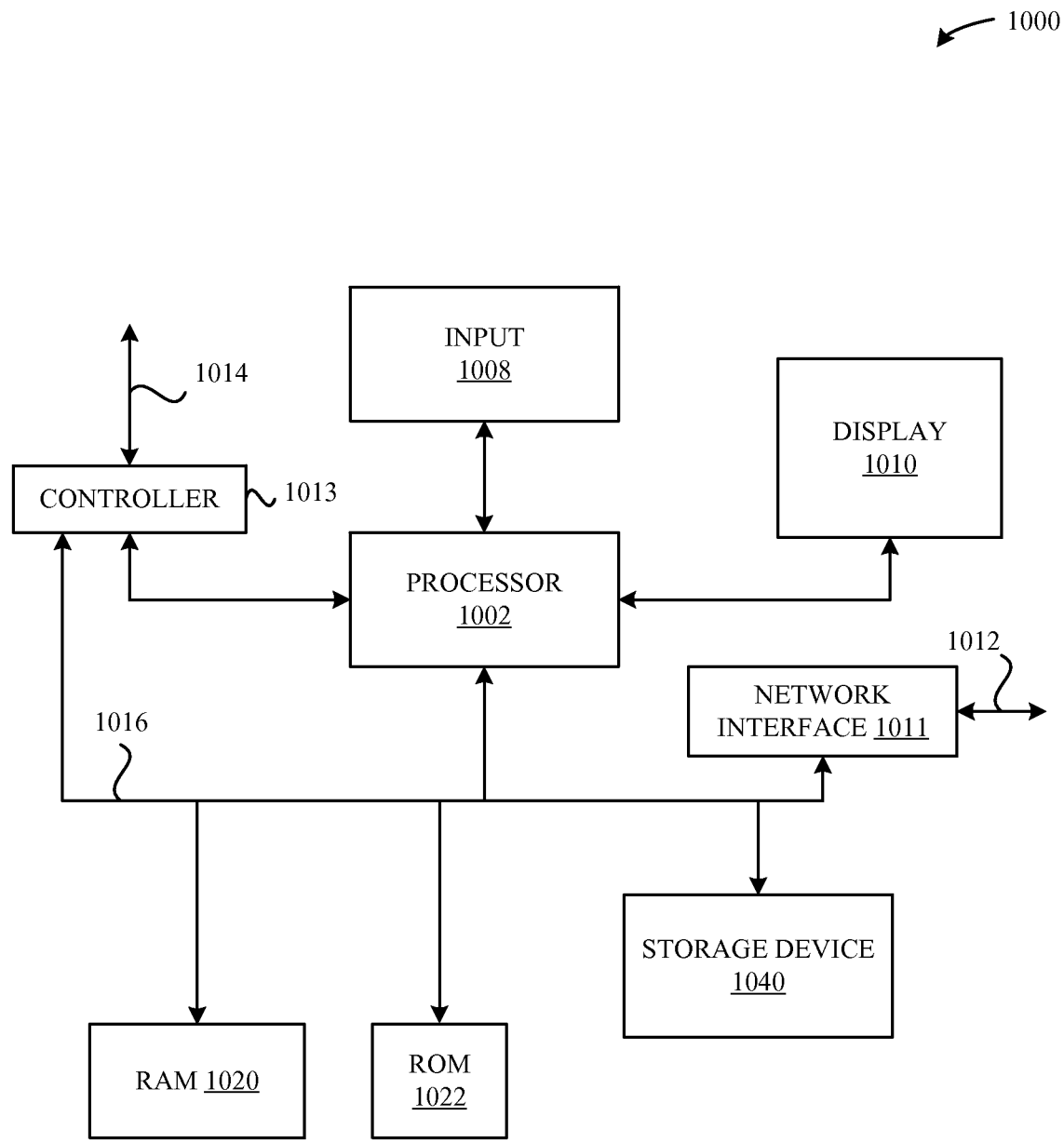
FIG. 10 illustrates a detailed view of a computing device that can be used to implement the various components described herein, according to some embodiments.

FIG. 10 illustrates a detailed view of a computing device 1000 that can be used to implement the various components described herein, according to some embodiments. In particular, the detailed view illustrates various components that can be included in the user device 110 illustrated in FIG. 1. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, email interface described herein). A data bus 1016 can facilitate data transfer between at least a storage device 1040, the processor 1002, and a controller 1013. The controller 1013 can be used to interface with and control different equipment through and equipment control bus 1014. The computing device 1000 can also include a network/bus interface 1011 that couples to a data link 1012. In the case of a wireless connection, the network/bus interface 1011 can include a wireless transceiver.

The computing device 1000 also include a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for scheduling delay-tolerant operations at a mobile computing device based on network quality predictions, the method comprising:

generating, at the mobile computing device, a model based on a usage pattern associated with the mobile computing device, wherein generating, at the mobile computing device, the model further comprises identifying particular time periods of network impairment at the mobile computing device using a clustering approach, the clustering approach utilizing input data comprising a signal strength metric corresponding to the network impairment and a duration of time for which the signal strength metric occurred at the mobile computing device;

receiving, from a program executing on the mobile computing device, a request for a prediction of network quality over a particular period of time, wherein the request is issued in response to a power availability threshold being satisfied;

generating, at the mobile computing device, the prediction of network quality based on the model, wherein generating the prediction of network quality is performed without an interaction with a remote server; and communicating the prediction of network quality to the program, wherein the program schedules a delay-tolerant operation at the mobile computing device, based on the prediction of network quality, to facilitate preserving battery power at the mobile computing device.

2. The method of claim 1, wherein the usage pattern comprises a pattern of network availability and network quality specific to one or more networks.

3. The method of claim 2, wherein the one or more networks comprises a WiFi and a cellular network.

4. The method of claim 2, wherein the prediction comprises information regarding when a particular network of the one or more networks will be available and when one or more transitions in the network quality of the particular network take place.

5. The method of claim 1, further comprising, subsequent to communicating the prediction of network quality to the program:
   identifying that a condition for generating a new model is satisfied; and
   generating the new model based on an updated usage pattern associated with the mobile computing device.

6. The method of claim 1, further comprising, prior to receiving the request from the program:
   notifying the program that the model has been generated.

7. The method of claim 1, wherein the model is generated using a machine learning technique.

8. The method of claim 1, wherein the delay-tolerant operation represents an operation that can be performed within an amount of time prior to a deadline.

9. The method of claim 1, wherein the clustering approach comprises k-means clustering, the k-means clustering generates a set of centroids corresponding to the particular time periods of sub-par network quality, and a particular probability of sub-par network quality decreases as a distance from each centroid increases.

10. The method of claim 1, wherein generating, based on the model, the prediction of network quality is based at least in part on input data related to the usage pattern associated with the mobile computing device over the particular time periods that are related to different days.

11. The method of claim 1, wherein the input data regarding the network impairment indicates a respective level of network quality corresponding to poor network quality or no network connectivity, the poor network quality corresponding to a first value of signal strength and the no network connectivity corresponding to a second value of signal strength lower than the first value of signal strength.

12. A non-transitory computer readable storage medium configured to store instructions that, when executed by at least one processor included in a mobile computing device, cause the mobile computing device to predict network quality, by carrying out steps that include:
   generating, at the mobile computing device, a model based on a usage pattern associated with the mobile computing device, wherein generating, at the mobile computing device, the model further comprises identifying particular time periods of network impairment at the mobile computing device using a clustering approach, and wherein the clustering approach utilizes input data comprising a signal strength metric corresponding to the network impairment and a duration of time for which the signal strength metric occurred at the mobile computing device;
   receiving, from a program executing on the mobile computing device, a request for a prediction of network quality over a particular period of time,
   wherein the request is issued in response to a power availability threshold being satisfied;
   generating, at the mobile computing device, the prediction of network quality based on the model, wherein generating the prediction of network quality is performed without an interaction with a remote server; and
   communicating the prediction of network quality to the program, wherein the program schedules a delay-tolerant operation at the mobile computing device, based on the prediction of network quality, to facilitate preserving battery power at the mobile computing device.

13. The non-transitory computer readable storage medium of claim 12, wherein the usage pattern comprises a pattern of network availability and network quality specific to one or more networks.

14. The non-transitory computer readable storage medium of claim 12 wherein the steps further include, subsequent to communicating the prediction of network quality to the program:
   identifying that a condition for generating a new model is satisfied; and
   generating the new model based on an updated usage pattern associated with the mobile computing device.

15. The non-transitory computer readable storage medium of claim 12, wherein the delay-tolerant operation represents an operation that can be performed within an amount of time prior to a deadline.

16. A mobile computing device configured to enable programs executing thereon to schedule delay-tolerant operations based on network quality predictions, the mobile computing device comprising:
   at least one processor; and
   at least one memory storing instructions that, when executed by the at least one processor, cause a program executing on the mobile computing device to:
      issue a request to perform a delay-tolerant operation, in response to identifying that a power availability threshold is satisfied;
      receive a prediction of network quality that is based on a model that is generated, at the mobile computing device, in accordance with a usage pattern associated with the mobile computing device, wherein the model is generated, at the mobile computing device, based at least in part on identifying particular time periods of network impairment at the mobile computing device using a clustering approach, wherein the prediction of network quality is generated at the mobile computing device without an interaction with a remote server, and wherein the clustering approach utilizes input data comprising a signal strength metric corresponding to the network impairment and a duration of time for which the signal strength metric occurred at the mobile computing device;

determine, based on the prediction of network quality, a time at which the delay-tolerant operation can be performed to yield a determined time to facilitate preserving battery power at the mobile computing device, and perform the delay-tolerant operation at the determined time.

17. The mobile computing device of claim 16, wherein the usage pattern comprises a pattern of network availability and network quality specific to one or more networks.

18. The mobile computing device of claim 17, wherein the one or more networks comprises a WiFi network and a cellular network.

19. The mobile computing device of claim 17, wherein the prediction comprises information regarding when a particular network of the one or networks will be available and when one or more transitions in the network quality of the particular network take place.

20. The mobile computing device of claim 17, wherein the at least one processor further causes the mobile computing device to, subsequent to communicating the prediction of network quality to the program:

identify that a condition for generating a new model is satisfied; and generate the new model based on an updated usage pattern associated with the mobile computing device.

21. The mobile computing device of claim 16, wherein the at least one processor further causes the mobile computing device to, prior to receiving the request from the program:

notify the program that the model has been generated.

22. The mobile computing device of claim 16, wherein the model is generated using a machine learning technique.

23. The mobile computing device of claim 16, wherein the delay-tolerant operation represents an operation that can be performed within an amount of time prior to a deadline.

* * * * *

UNITED STATES PATENT AND TRADEMARK OFFICE
CERTIFICATE OF CORRECTION

PATENT NO. : 10,789,542 B2  
APPLICATION NO. : 14/866823  
DATED : September 29, 2020  
INVENTOR(S) : Franco Travostino Page 1 of 1

It is certified that error appears in the above-identified patent and that said Letters Patent is hereby corrected as shown below:

In the Claims

Column 15, Line 22 (Claim 19), "one or networks" should read --one or more networks--.

Signed and Sealed this  
Twenty-fourth Day of November, 2020

Andrei Iancu  
*Director of the United States Patent and Trademark Office*